US005383130A

United States Patent [19]

Kalisiak

[11] Patent Number: 5,383,130

[45] Date of Patent: Jan. 17, 1995

[54] JOB SEPARATOR CONTROL

[75] Inventor: Michael S. Kalisiak, North Tonawanda, N.Y.

[73] Assignee: Moore Business Forms, Inc., Grand Island, N.Y.

[21] Appl. No.: 537,457

[22] Filed: Jun. 14, 1990

[51] Int. Cl.6 ........................ G06F 15/46; B41F 13/58; B41L 1/32

[52] U.S. Cl. ........................................ 364/471; 270/39; 493/357; 493/411

[58] Field of Search ........................ 364/469, 471, 478; 270/39, 52, 52.5, 58, 5, 30-31; 493/357-359, 411-414

[56] References Cited

U.S. PATENT DOCUMENTS

| | | | |
|---|---|---|---|
| 4,025,023 | 5/1977 | Moffitt | 225/100 |
| 4,331,050 | 5/1982 | Gergek | 83/71 |
| 4,577,789 | 3/1986 | Hofmann et al. | 225/100 |
| 4,593,893 | 6/1986 | Suter | 270/52.5 |
| 4,688,708 | 8/1987 | Irvine et al. | 225/100 |
| 4,768,410 | 9/1988 | Wood | 83/63 |
| 4,781,090 | 11/1988 | Feldkamper et al. | 83/74 |
| 4,846,454 | 7/1989 | Parkander | 270/39 |
| 5,014,971 | 5/1991 | Folsom | 270/39 |

*Primary Examiner*—Roy N. Envall, Jr.
*Assistant Examiner*—Thomas E. Brown
*Attorney, Agent, or Firm*—Nixon & Vanderhye

[57] ABSTRACT

Continuous forms (e.g. computer paper with individual sheets separated by perforations) of one job are automatically folded and separated from the forms of the next job. Detectable marks are printed within a window onto the first form of one job, or the last of another, in a first mode, or the forms are counted in a second mode. The marks within the window are sensed by an LED sensor, which feeds information to a computer (microprocessor) control. The computer control effects operation of a cutting blade to sever the last form of one job from the first form of the next. The forms are automatically folded in a festooning action by a Bunch folder. Hall effect sensors are mounted for cooperation with notched discs on the same shaft as beaters of the Bunch folder, and function as end of travel limit switches for the folder swing chute, to provide relevant data to the microprocessor for proper operation of the cutting blade.

23 Claims, 7 Drawing Sheets

*Fig. 2*
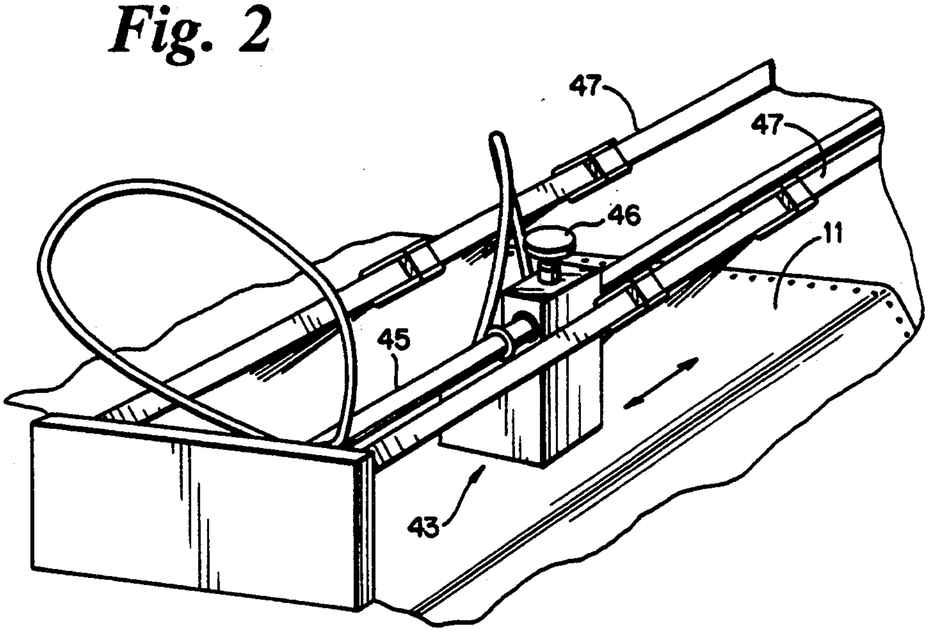
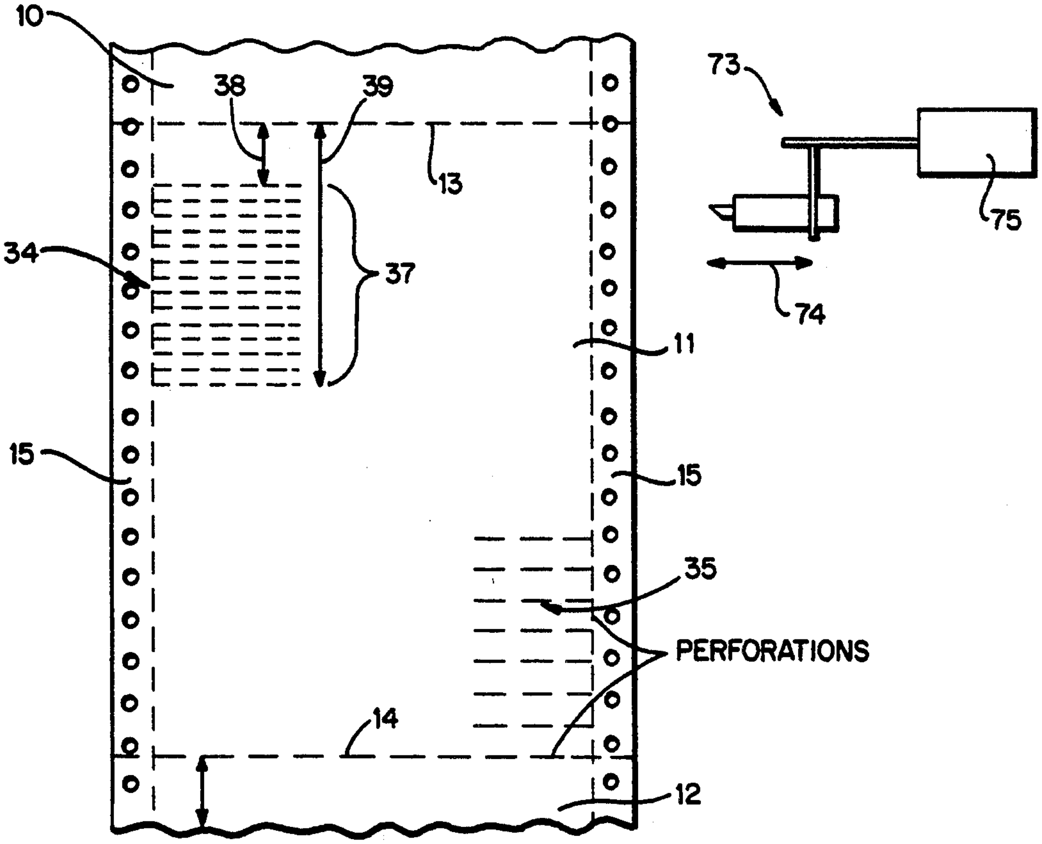
*Fig. 9*

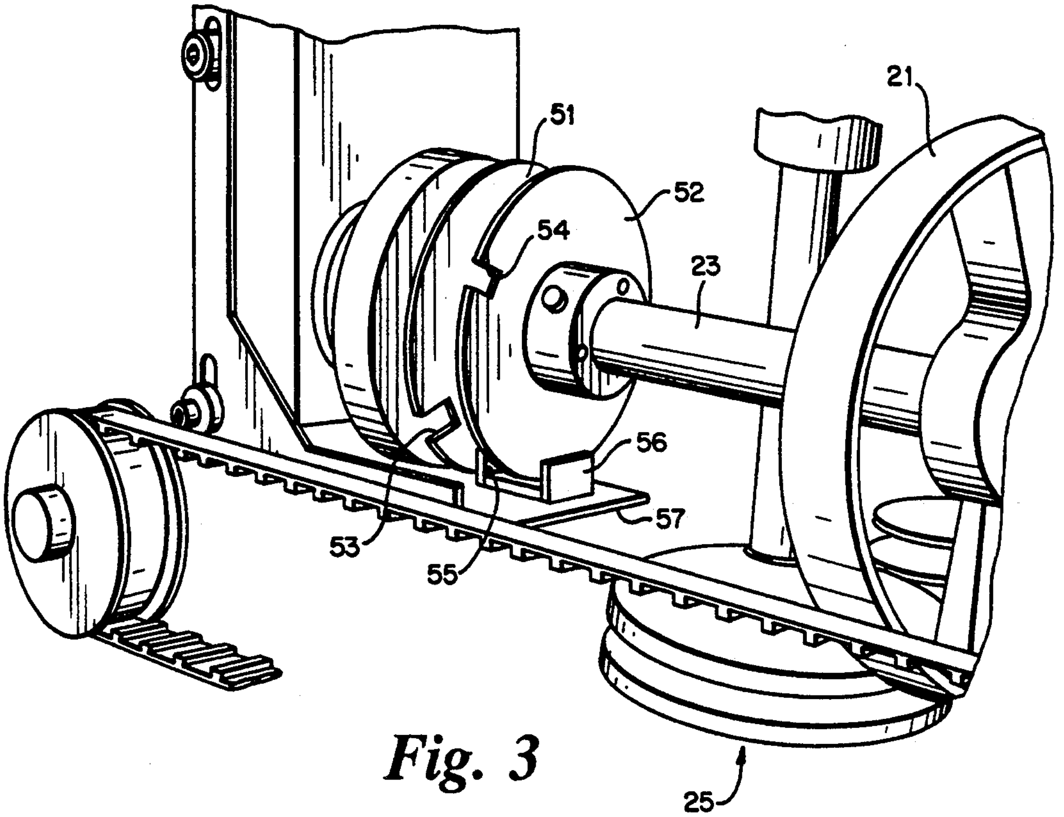
*Fig. 3*
*Fig. 4*
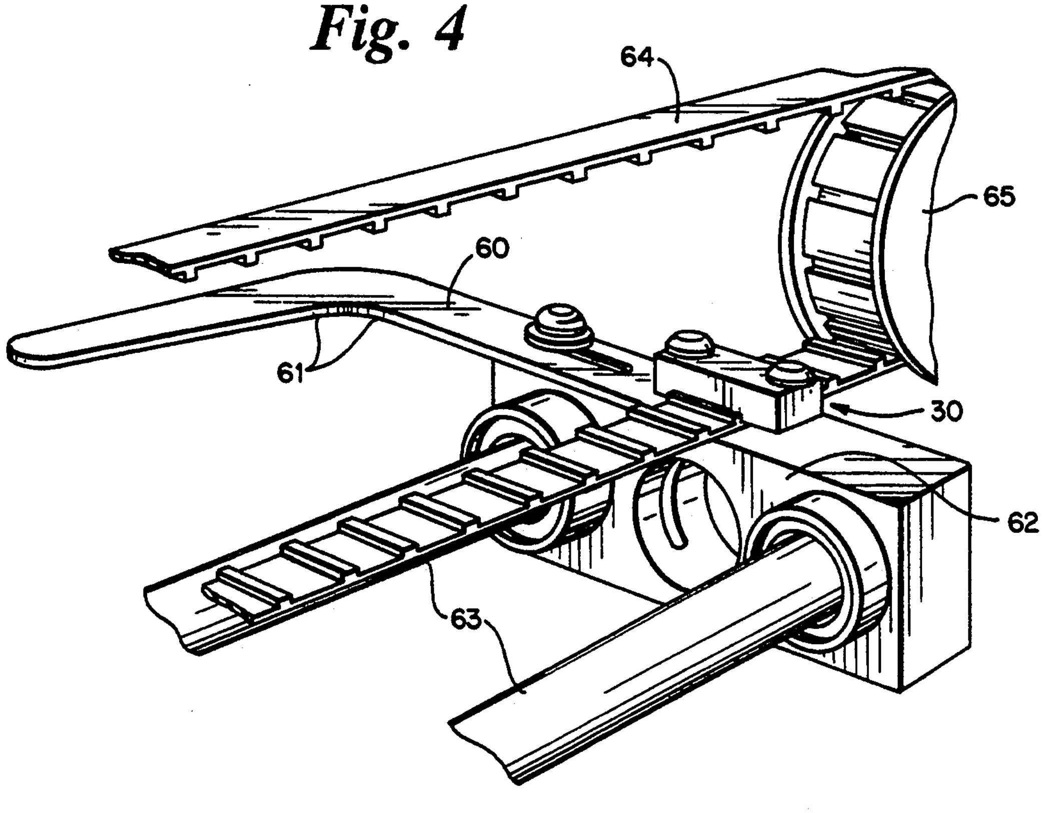

JOB SEPARATOR CONTROL

BACKGROUND AND SUMMARY OF THE INVENTION

In the automatic printing and folding of business forms, it is very desirable to provide for automatic separation between the last form in one job and the first form in the next. Typically, continuous form paper (e.g. computer paper) is printed in a laser printer or the like, and then is fed to a folder. If the jobs are not separated from each other in an effective manner after or during the folding action, then it will be very difficult for the operator to find the interface between jobs and to separate the printed jobs from each other.

According to the present invention a method and apparatus are provided for automatically separating a continuous flow of business forms into predetermined jobs. The apparatus according to the invention uses basically conventional components, and effects the separating function in conjunction with a conventional Bunch folder, a known effective folder manufactured by B. Bunch Company of Phoenix, Ariz. According to the invention, the control of a severing mechanism for severing the last form in one job from the first form in the next is controlled in a very precise manner so that severing occurs only along the perforation, and positively between two jobs. The invention is versatile, having two modes of operation to effect severing.

In the normal usage, the forms job completion is determined in one of two ways. In a first mode, a certain number of forms is set for each job. This can be accomplished by simply counting the number of forms, as by using end of travel sensors on a folding mechanism. In a second mode, a detectable mark is applied to a "window" area of one or more forms in job, preferably to the first or last form (although the mark can be applied to another form as long as its location within the job is known). In the second mode, the mark is sensed by an LED commercially available sensor, or the like, and the sensed information is fed to a microprocessor control board. The microprocessor also receives end of travel information associated with the folder swing chute during festooning action by the folder, such as Hall effect sensors, and severing action is controlled precisely based upon this information.

Alternatively, a conventional ANSI Standard Bar Code, or proprietary bar code, could be marked on one of the forms in a job. Using an appropriate bar code scanner or reader—e.g. a fixed or moving beam visible or infrared laser LED scanner, such as those made by MICRO-SCAN or SCAN-A-MATIC—the bar code would be sensed. This would permit further identification of the job.

According to one aspect of the present invention, apparatus for automatically separating a continuous flow of business forms in predetermined jobs is provided after the application of detectable marks to at least the first or last form of each job. The apparatus comprises: Means for transporting the forms in a first direction. Folding means for automatically folding the forms at their perforated connections to each other, the folding means comprising a swing chute mounted for oscillating movement about a generally horizontal axis and for receipt of forms thereon; a plurality of spirals mounted for rotation about vertical axes and adjacent the swing chute, for receipt of the edges of the forms after engagement by the swing chute; and a plurality of beaters mounted for rotation about at least one axis parallel to the swing chute axis, for acting on the forms to keep them in operative association with the spirals. Means for automatically sensing the detectable marks on a form as it travels in the first direction, this sensing means between the position marks are applied, and the folding means. Sensing means for automatically selectively severing (e.g. cutting) the forms along a perforation between adjacent forms during folding; microprocessor controlled control means responsive to the sensing means for initiating operation of the sensing means when predetermined detectable marks have been detected by the sensing means. Means may be provided for mounting the mark sensing means so that it is adjustable horizontally in a second dimension perpendicular to the first direction of travel of the forms during sensing, and hold-down brushes may be provided adjacent the area of mark sensing for holding down and smoothing the forms in that area. The home position of the cutting blade of the sensing means may be sensed by a limit switch to insure that the cutting blade is automatically returned to the home position.

According to another aspect of the present invention there is provided a method of separating forms comprising individual jobs from a continuous flow of forms. The method comprises the steps of: (a) Continuously transporting the forms in a first direction. (b) Applying detectable marks to at least one form in each job, the marks having a density greater than the density of printed areas on the forms. (c) Sensing the detectable marks on a form as it moves in the first direction. (d) Folding the forms in a festooning manner so that each form has the adjacent forms separated by perforations on the respective top and bottom thereof; and (e) Selectively, in response to step (c), effecting severing of the last form in one job from the first form in the next job along the connecting perforations. The marks are applied within a window having a top thereof spaced from the leading edge of each form on which marks are applied to a predetermined first distance, having the bottom thereof spaced a predetermined second distance from the leading edge, step (c) being effectively practiced only within the window.

According to another aspect of the invention there is provided the following method: (a) Continuously transporting the forms in a first direction. (b) Determining how many forms are in a particular job. (c) Counting the number of forms for the particular job until all of the forms for that job have been counted. (d) Folding the forms in a festooning manner so that each form has the adjacent forms separated by perforations on the respective top and bottom thereof. And, (e) selectively, in response to step (c), effecting severing of the last form in one job from the first form in the next job along the connecting perforations. Counting may be done using end of travel sensors associated with the folding action.

It is the primary object of the present invention to provide a simple and effective method and apparatus for automatically separating a continuous flow of business forms into predetermined jobs. This and other objects of the invention will become clear from an inspection of the detailed description of the invention and from the appended claims.

BRIEF DESCRIPTION OF THE DRAWINGS

FIG. 2 is a detailed perspective view of a sensor and associated hold-down brushes in operative association with a form during sensing;

FIG. 3 is a detailed perspective view of various internal sensing components of the apparatus of FIG. 1;

FIG. 4 is a detailed perspective view of a cutting blade and blade moving mechanism for effecting severing of forms of one job from forms of the next;

FIG. 9 is a top schematic view of exemplary continuous forms according to the invention, prior to folding.

DETAILED DESCRIPTION OF THE DRAWINGS

Figure 1:
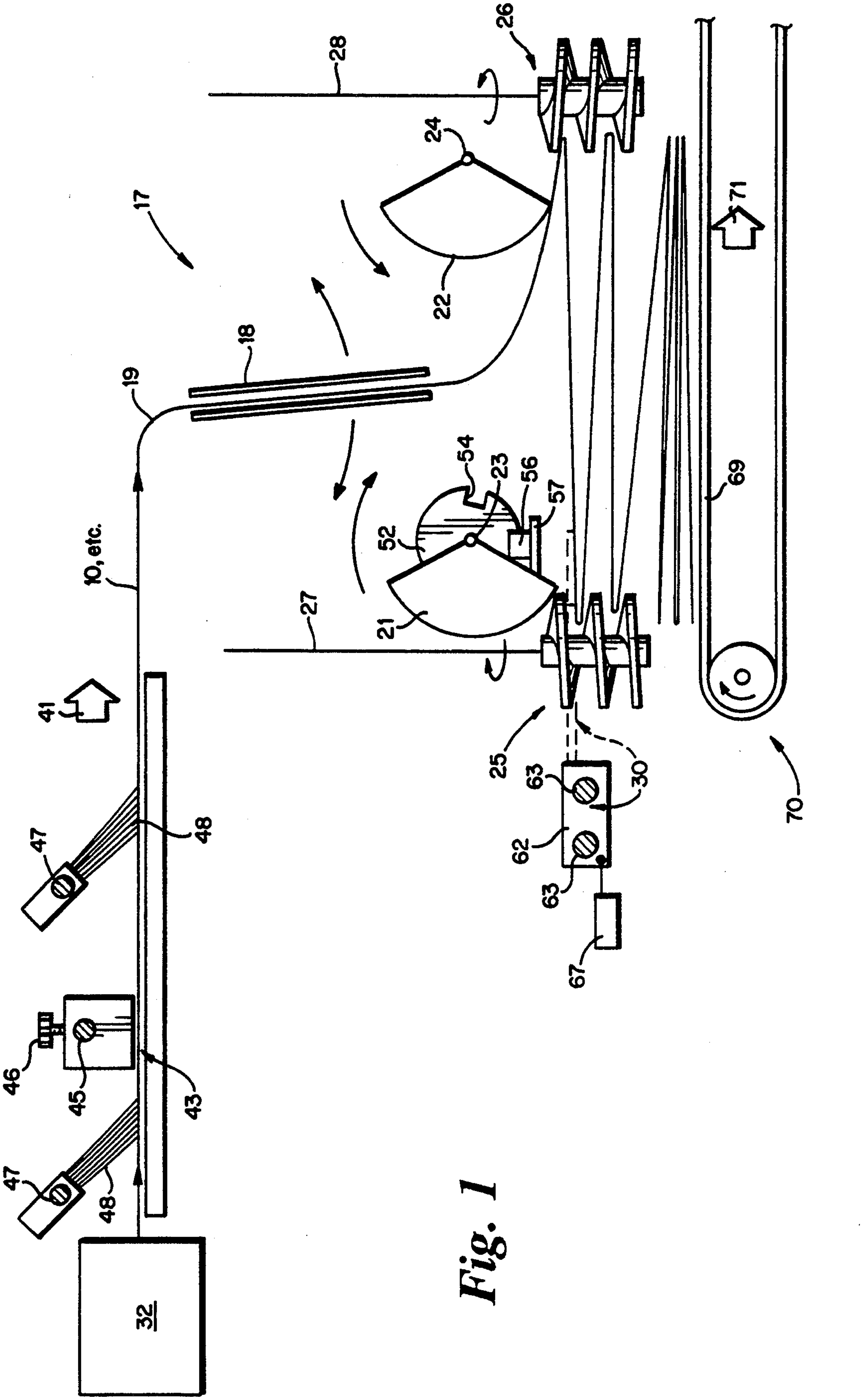
FIG. 1 is a side schematic view of exemplary apparatus according to the present invention.

According to the present invention it is possible to automatically separate a continuous flow of business forms into predetermined jobs, each job comprising a plurality of business forms wherein each form is connected by perforations to another form. The forms are typically exemplified by sheets of computer paper, as illustrated by sheets 10, 11, and 12 in FIG. 9, each form being separated from adjacent forms by perforations (e.g. 13, 14 in FIG. 9); however, the forms may be multi-part as well as one-part. The forms normally, but not necessarily, have removable tractor drive edge portions 15. According to the invention, the last form in one job—form 11 in FIG. 9—is separated from the first form of the next job—form 12 in FIG. 9—along the perforation therebetween—perforation 14 in FIG. 9.

The invention is particularly suited for use with a conventional Bunch folder, which is manufactured by B. Bunch, in Phoenix, Arizona. The conventional components of a Bunch folder—which is indicated generally by reference numeral 17 in FIG. 1—comprise a swing chute 18 which is mounted for pivotal movement about an axis 19 to move forms 10, etc., passing between the faces thereof in a festooning action to fold the forms, as illustrated in FIG. 1, with each form ultimately folded so that the prior adjacent form (e.g. form 10 when considering form 11) is below it, and the following adjacent form (form 12 for form 11) is above it when the forms are stacked. The conventional Bunch folder also comprises a plurality of beaters 21, 22 rotatable by shafts 23, 24 to facilitate the folding action, and to maintain the folded forms in operative association with a plurality (four—only two are shown in FIG. 1) of spirals 25, 26 mounted for rotation about vertical axes 27, 28, respectively. A cutting means, shown generally by reference numeral 30, effects severing along the perforation line (e.g. 14) when severing action is initiated.

The apparatus according to the invention is utilized in association with a conventional laser printer 32, or the like, which applies printed matter to the forms 10, etc. In addition to applying printed matter to the forms 10, etc., the printer 32 (which may be an IBM 3800 Printer) applies marks of a predetermined configuration, position, or sequence, to a form in a predetermined position in the job (e.g. the first form of one job or the last form of another). In a "second" mode in which marks are applied only to the last form of one job or the first form of another, a plurality of dense marks will be printed in a particular "window" on the desired form.

Exemplary marks that are printed by printer 32, or the like, on a typical form 11—the last form in one job—are illustrated generally by reference numeral 34 in FIG. 9. It is necessary that the marks 34 be printed so that they are denser than typical printing on the form 11 (e.g. the printing 35) so that the sensors and related control equipment can be sure that the appropriate form is being sensed and/or acted upon. The marks 34 are preferably disposed within a window 37 which is spaced a first distance 38 from the leading edge perforation 13 of the form 11, at the top thereof, and at the bottom thereof is spaced a second distance 39 from the perforation 13. Only the marks within the "window" 37 will be sensed.

While the marks 34 may be provided with a wide variety of configurations, spacing, and density, one particularly appropriate example is to provide 2 to 4 characters per print line, each character containing 5 to 7 equally spaced horizontal lines. The effect of 2 to 4 characters in a line will be marks about $\frac{1}{4}$ to $\frac{3}{8}$ inch across the width of the form web. The marks may be provided the entire length of the form 11 if desired, although only those marks 34 within the window 37 will be sensed.

According to the invention, means for automatically sensing the detectable mark 34 applied to the form 11, etc., are provided between the printer 32 and the folder 17. The forms 10, etc., are fed in a direction of travel 41 (see FIG. 1) by conventional feeding equipment (e.g. rollers) associated with the printer 32, the folder 17, and the like. The sensing means are illustrated schematically by reference numeral 43 in FIGS. 1 and 2. While a wide variety of sensors may be utilized, a particularly suitable sensor is a Hewlett-Packard bar code sensor, which utilizes LEDs as a sensing element, which may be packaged in a particular configuration with a circuit board and cables. Such sensor packages are available from Toppan Moore, for use on their Product No. TM470-II.

Alternatively, a conventional ANSI Standard Bar Code, or proprietary bar code, could be marked on one of the forms in a job. Using an appropriate bar code scanner or reader (not shown)—e.g. a fixed or moving beam visible or infrared laser LED scanner, such as those made by MICRO-SCAN or SCAN-A-MATIC—the bar code would be sensed. This would permit further identification of the job.

In order to provide adjustment for the sensing position depending upon the width of the forms web, or like parameters, and in order to provide proper sensing, the detailed structures illustrated in FIGS. 1 and 2 are utilized. In particular, preferably a rod 45 is provided which extends in a dimension perpendicular to the dimension of travel 41, and on which the sensor 43 is mounted for slidable movement. An adjustment screw 46 may be provided. When the adjustment screw 46 is loosened, the sensor 43 may be moved to any desired horizontal position along the rod 45, but when the screw 46 is tightened, the sensor 43 positively remains in place. Adjustably mounted on the bar or bars 47—parallel to bar 45—are one or more hold-down brushes 48. Their function is to hold down and smooth the forms 10, 11, etc. at the area of sensing by the sensor 43.

In order to provide for positive control of the cutting-/severing mechanism 30, it is necessary to know exactly where the perforations 13, 14 are in the web of forms. In order to effect this, according to the present invention a pair of end of travel sensors for the swing chute 18 are provided. While these sensors may take a wide variety of forms, the preferred embodiment illustrated in FIGS. 1 and 3 may take the form of first and second discs 51, 52 having peripheral cutouts 53, 54, respectively, therein. The first disc 51 has only one notch 53 therein, while the second disc 52 has two notches 54 therein which are 180° apart. The notches 53, 54 in the discs 51, 52 are sensed by a pair of Hall effect sensors 55, 56 (acting as limit switches) which are mounted in operative association therewith on a plate 57. The Hall effect sensors 55, 56 may be of the type commercially available from Micro Switch, a Honeywell Corporation division, which are known as 3AV/4AV integral magnet position sensors. Sensor disc 52 is utilized to determine when each perforation is present to zero the count of marks, while the disc 51 is utilized—in conjunction with the sensor 43—to determine when operation of the cutting means 30 should be effected.

The discs 51, 52 preferably are mounted on the shaft 23, which rotates the beaters 21. A conventional encoder 58 (see FIG. 5) may also be mounted on the shaft 23, or like component of the folder 17, to be driven thereby. A conventional suitable encoder is one manufactured by BEI. Because of the conventional drive and gearing components of the Bunch folder 17, the rotation of shaft 23 will be coincident with the swinging movement of the swing chute 18, therefore after initial adjustment the cutouts 53, 54 will be positively related to the positions of perforations between forms.

The exemplary cutting means 30 illustrated in FIGS. 1 and 4 is a conventional cutting means on a Bunch folder 17. It comprises a blade 60 having a dull edge 61 which is adapted to engage a perforation 13, 14 right after form 11, etc., has left the bottom of folder 18. The blade 60 is mounted on a carriage 62 which is guided by guide bars 63 in a direction of movement transverse to the direction 41, and is powered by a drive including the toothed belt 64 and "sprocket" 65, as well as a motor 66 (see FIG. 5) for powering sprocket 65. The blade 60 is moved by the motor 66 at a speed that is an order of magnitude faster than the speed of paper travel in direction 41; typically the blade 60 goes across and back, to perform a severing action and return to the home position, in about $\frac{1}{4}$–$\frac{1}{3}$ second. A home position limit switch 67 senses the return of the cutting mechanism 30 to its "home" position for initiation of another cut.

After the forms have been folded by the folder 17, they may be deposited on top of a belt 69 of a conveyor 70. The conveyor 70 may either move slowly continuously in the direction 71 so as to continuously remove folded forms (which may end up slightly offset from each other) in the direction 71. Alternatively, after a severing action has been completed, the conveyor 70 can be operated to move the forms stacked thereon quickly in the direction 71 in increments equal to the length of the forms, so that the job which has been folded and placed on the conveyor belt 69 will be separated physically from the next job coming along. Alternatively, or in addition, the forms may be marked along their edge adjacent the interface. For example, a conventional inked marker 73 (see FIG. 9) may be mounted for movement in the dimension 74 by a fluid cylinder 75 or like actuating component to automatically move into contact with an edge of the form 11 to provide a visual indication (e.g. a dark black mark) at the interface between two jobs.

Figure 5:
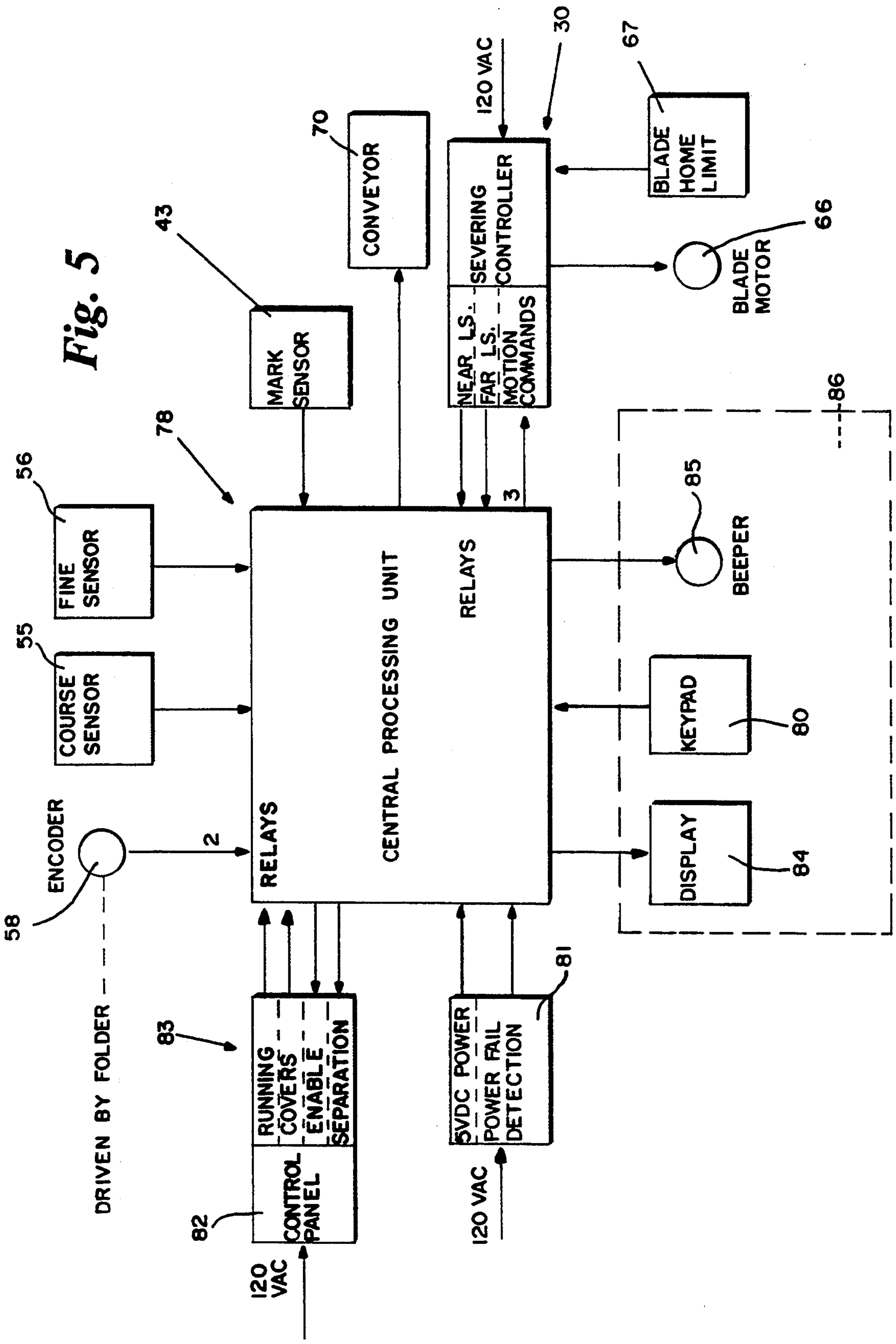
FIG. 5 is a block diagram showing the interrelationship between component parts of the apparatus according to the invention.

FIG. 5 schematically illustrates the interrelationship between the components heretofore described and the microprocessor board 78 which provides for the control of all of the other components. The processor control board 78 may comprise a Zilog Z-80 based central processing unit. It is provided with inputs from the Hall effect sensors, 55, 56, the encoder 58, the mark sensor 43, one or more limit switches 67 associated with the severing mechanism 30, and a 16 position conventional key pad 80. A power supply is indicated at 81, and a power supply and control panel 82 are for the folder 17. The components 83 illustrated in FIG. 5 provide the interlock status associated with the folder 17, etc., as will be hereinafter explained. The CPU 78 controls the severing mechanism 30, conveyor 70, the folder 17, a two row by twenty column display 84, and a beeper 85. The components 80, 84, and 85 preferably are mounted on a control panel, illustrated schematically at 86. The beeper 85 provides a short "beep" whenever a job is completed, and a long "beep" if there is an error signal.

Figure 6:
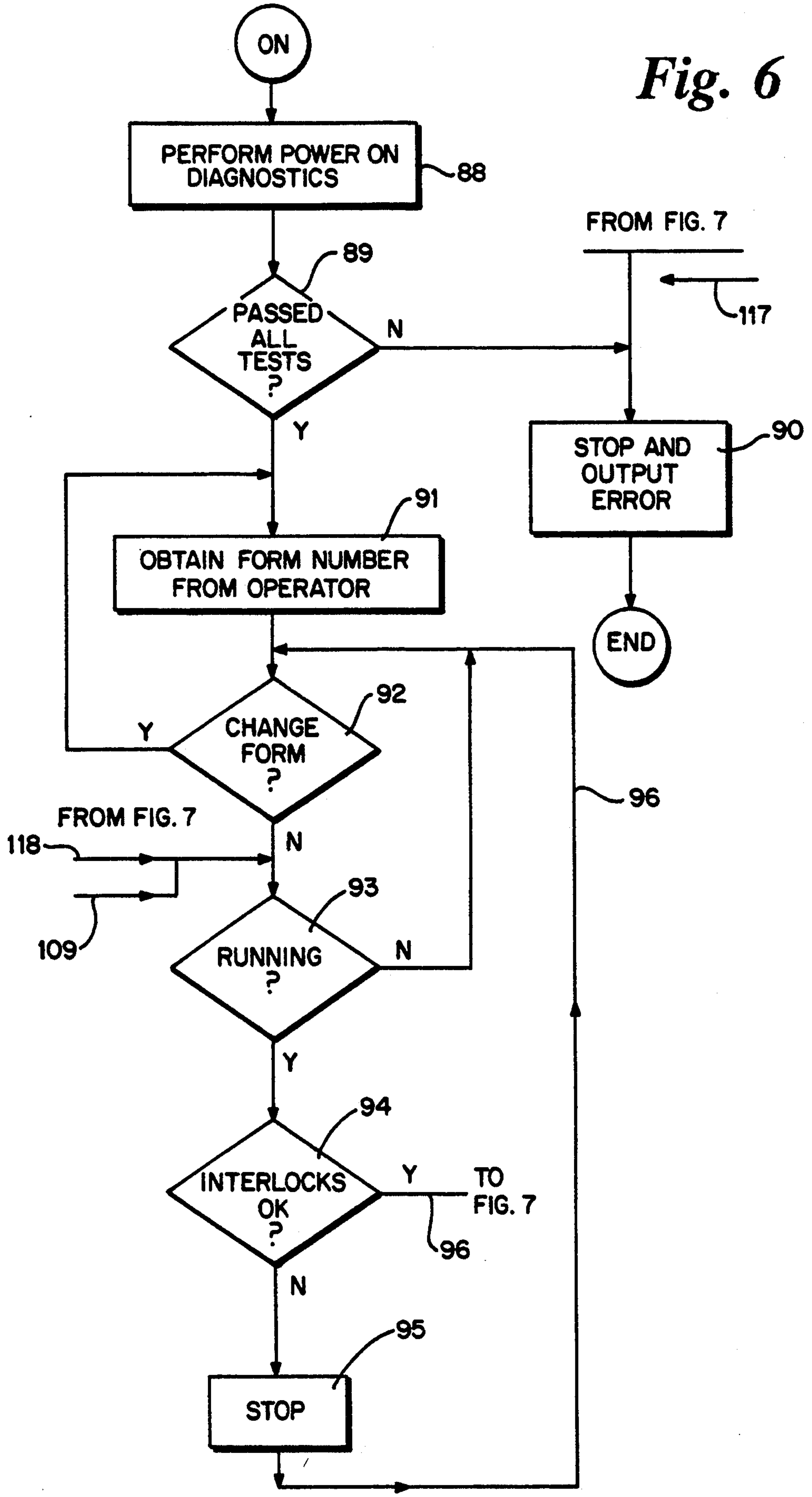
FIGS. 6 through 8 provide a flow diagram illustrating an exemplary operation of the method and apparatus according to the invention.
Figure 7:
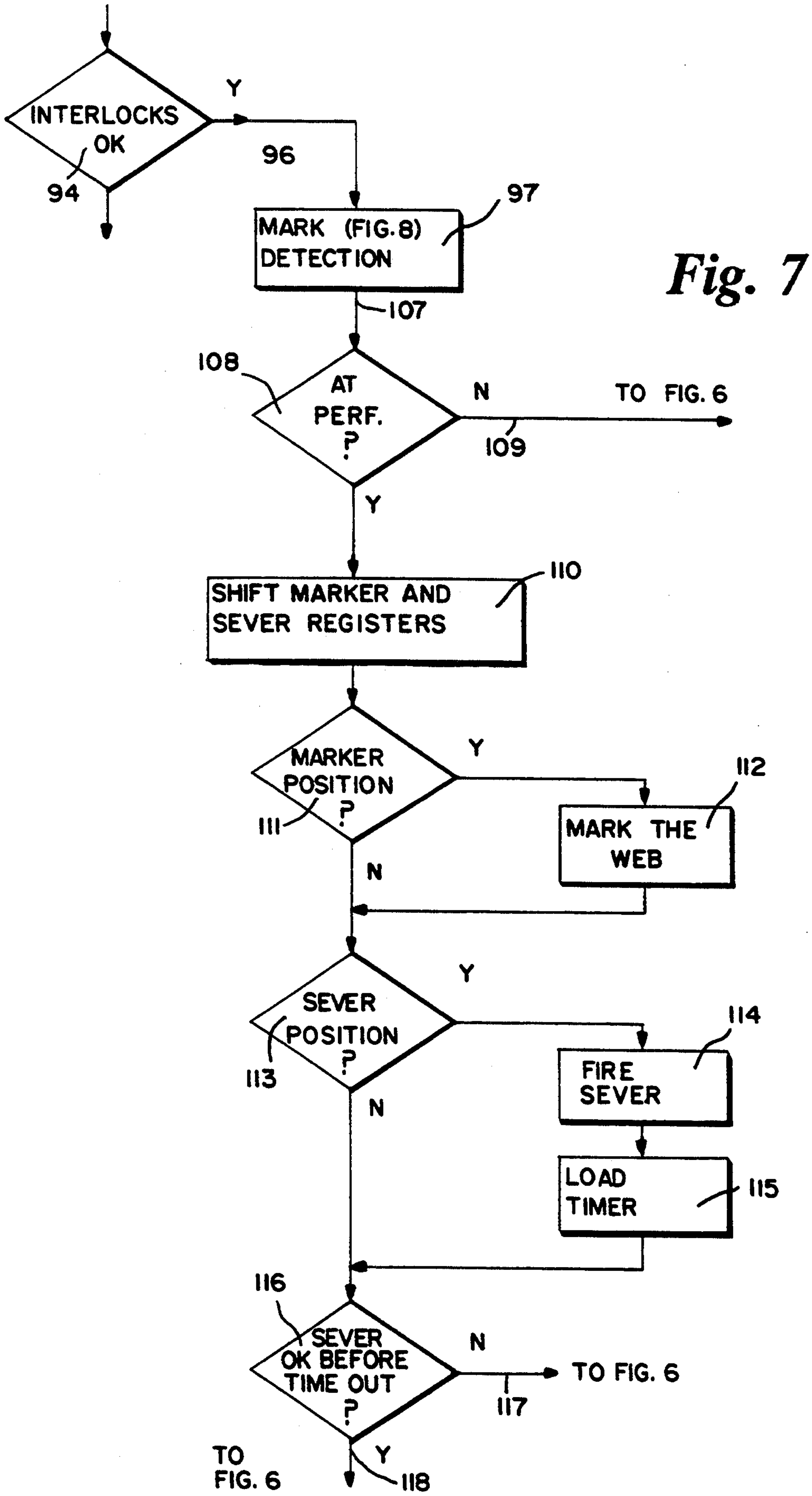
Figure 8:
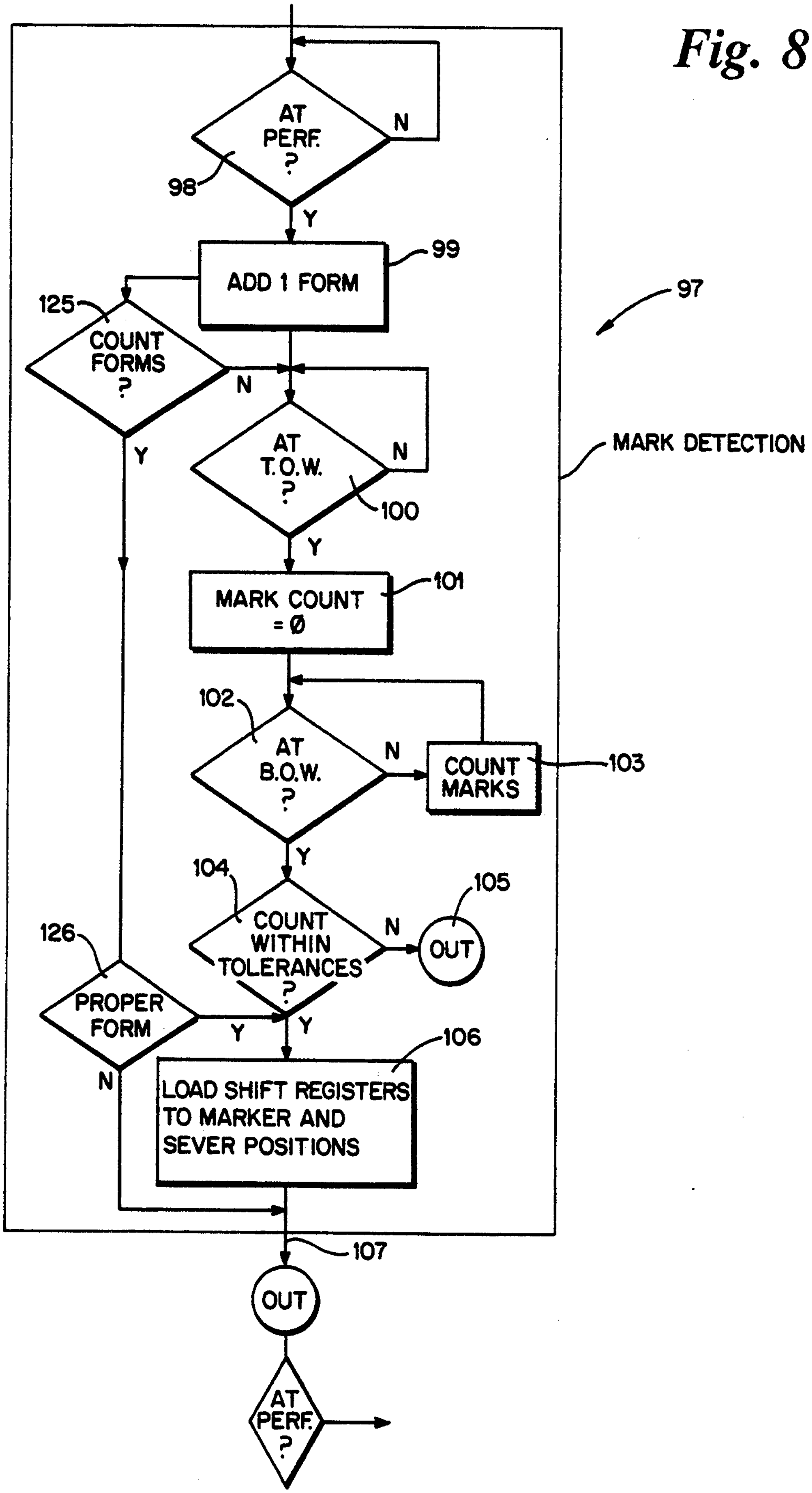

The flow charts of FIGS. 6 through 7 illustrate a typical control sequence for the apparatus of the invention in which a mode where the first or last form of a job is marked. In FIGS. 6 through 8 "do" blocks are indicated by a rectangle, and "decision" blocks are indicated by a diamond.

After the machine is turned on, conventional diagnostics are performed by the microprocessor board 78, as indicated at 88, for safety purposes. The diagnostic tests are evaluated at 89, and if they all are not passed, the machine is stopped and an output error printed at 90. Operator intervention is then necessary. If all the tests are passed, then the operator can input the particulars of the forms to be handled utilizing key pad 80 at block 91.

It is desirable to set up a number of different forms which may be referenced merely by a number; e.g. 16 different sizes with two options for each size (e.g. either last page marks or first page marks for a particular job). The form can be changed as desired as indicated at 92, but if the form is not changed, then the machine should be running at 93, at which point it reads inputs from various components of the machine, including the status of relays, and voltages, etc. Assuming that it is running properly, then the interlocks are evaluated at 94 (e.g. are the covers closed, etc.). If the interlocks are not all properly engaged, then machine operation is stopped at 95, and there is feedback through 96 back to decision block 92. If all the interlocks are o.k., then operation proceeds along branch 96 to mark detection block 97 (FIG. 7).

Exemplary details of mark detection block 97 are indicated in FIG. 8. First, the proximity to a perforation between forms is evaluated at 98, evaluation continuing until proximity to a perforation—which is sensed by the sensing means 56 associated with disc 52—is determined, at which time passage of one form is counted at 99. Then an evaluation is made as to whether or not the form is at the top of the window (T.O.W) 37 (see FIG. 9) at 100, this evaluation continuing until the top of the window is determined (spacing 38 from perforation 13). Then the mark count is zeroed at 101, and an evaluation of the bottom of the window (B.O.W) 37 is evaluated at 102. The number of marks 34 is counted at 103 and only after the appropriate number of marks has been counted, as determined to be within window minimum and maximum tolerances at 104, will the severing operation take place. If the count is within the tolerances at 104—that is if the marks 34 are really designed to be end of job marks—the procedure passes out of the loop, at 105. If the count is within tolerance, then a shift register is loaded at 106.

At 106 a conventional shift register is loaded with one bit. The shift register length will vary based upon formed depth. Its length will be the number of forms between the sensor and the severing location. A "one" will be put into the most significant location of the register. Each time a folder 17 pulse (from 55, 56) comes in, the register is shifted. When a one bit is shifted out a sever is initiated (a zero shifted out is irrelevant). Thus, the severing activity occurs synchronously with the receipt of the "top of folder" signal, insuring reliable and repeatable control of the sever.

The first decision block after line 107 is an evaluation of proximity to the perforation between the forms to be severed, at 108. If it is not at a perf, as indicated at line 109, there is a loop return to FIG. 6 until there is appropriate proximity to a perforation. Once the appropriate proximity to a perforation is determined, the shift marker and sever registers are advanced as indicated at 110 (having been previously loaded at 106). The sever register and decisions are always utilized, however, the marker register and decisions are optional.

Assuming that a marker (73 in FIG. 9) is utilized, a desired position for marking is evaluated at 111, and the web is marked at 112 by actuation of the cylinder 75 or like power source. If the severed position is appropriate at 113, then the sever is actuated at 114, and the timer loaded at 115. The sever actuation at 114 is accomplished by energizing motor 66 which moves the blade 60 completely across the width of the forms 10, etc. at high speed. The timer is loaded at 115 to insure that the blade 60 has returned to its home position—sensed by microswitch 67—within a predetermined time period (e.g. ½ second). If it has not returned in time, as indicated at decision block 116, then as indicated at 117 the machine is stopped at 90 and an output error displayed on display 84 (as well as a long beep by beeper 85). If the sever is appropriately completed, as indicated at 118, the entire sequence re-loops to just before the decision block 93. At the block 118 in addition to determining return of the blade to the home position, failure of the blade to move at all, over travel, or a number of other errors may also be detected, an error message displayed, and the system shut down.

The printer 32 is separately controlled to apply the appropriate marks 34, or bar codes. Such a printer control is conventional.

For the mode in which a form count is to be utilized to activate the sever mechanism, the decision blocks on the left side of FIG. 8 are utilized. Upon selection of appropriate controls, from block 99 the "count forms" decision 125 is implemented. If "Yes", then every time a proper form is determined at 126—sensed by the end of travel sensors 55, 56—the shift register 106 is loaded, and once the appropriate number of forms has been counted, the severing action takes place as described above.

It will thus be seen that according to the present invention a method and apparatus have been provided which allow for simple yet effective modification to conventional equipment to provide automatic separation of forms in one job and the next.

While the invention has been herein shown and described in what is presently considered to be the most practical and preferred embodiment thereof, it is to be understood that the invention is not to be limited to the disclosed embodiment, but on the contrary, is intended to cover various modifications and equivalent arrangements included within the spirit and scope of the appended claims.

What is claimed is:

1. Apparatus for automatically separating a continuous flow of business forms into predetermined jobs, each job comprising a plurality of business forms wherein each form is connected by perforations to another form, wherein detectable marks have been applied to at least one form of each job comprising:

means for transporting the forms in a first direction;

folding means for automatically folding the forms at their perforated connections to each other, said folding means comprising a swing chute mounted for oscillating movement about a generally horizontal axis and for receipt of forms therein; a plurality of spirals mounted for rotation about vertical axes and adjacent said swing chute, for receipt of the edges of the forms after engagement by said swing chute; and a plurality of beaters mounted for rotation about at least one axis parallel to said swing chute axis, for acting on the forms to keep them in operative association with said spirals;

means for automatically sensing the detectable marks on a form as it travels in the first direction, said means between a position where marks have been applied and said folding means;

severing means for automatically selectively severing the forms along a perforation between adjacent forms, during folding;

microprocessor controlled control means responsive to said sensing means for initiating operation of said severing means when predetermined detectable marks have been detected by said means; and wherein said control means comprises: first and second notched discs mounted for rotation on a first shaft, said first disc having a pair of notches spaced approximately 18°, and said second disc having a single notch, and means for sensing said disc notches; and an encoder on said shaft, said encoder and said disc sensing means for determining the position of perforations between said forms for zeroing the detection of marks by said mark sensing means and for initiating operation of said severing means when desired.

2. Apparatus as recited in claim 1 further comprising conveyor means disposed below said spirals and on which said forms are deposited after folding; said control means comprising means for operating said conveyor means to remove a predetermined job of forms once said severing means has severed that job from the following job.

3. Apparatus as recited in claim 1 wherein said first shaft also mounts a plurality of said beaters for rotation about a horizontal axis.

4. Apparatus as recited in claim 1 wherein the marks are applied to a form within a window area of the form, the window area defined between a predetermined first distance from a perforation at the leading edge of the form and a second distance a predetermined spacing from the leading edge.

5. Apparatus as recited in claim 1 wherein said mark sensing means comprises an LED sensor.

6. Apparatus as recited in claim 1 wherein said means for sensing notches in said discs comprise Hall effect sensors.

7. Apparatus as recited in claim 1 further comprising means for mounting said mark sensing means so that it is adjustable horizontally in a second dimension perpendicular to the first direction of travel of said forms during sensing.

8. Apparatus as recited in claim 7 further comprising hold down brushes for holding down and smoothing the forms adjacent the area of mark sensing.

9. A Method of separating the forms comprising individual jobs from a continuous flow of forms, each form being connected by perforations to adjacent forms, comprising the steps of:

(a) continuously transporting the forms in a first direction;

(b) applying detectable marks to at least one form in each job, the marks having a density greater than the density of printed areas on the forms; then (c) sensing the detectable marks on a form as it moves in the first direction; then (d) folding the forms in a festooning manner so that each form has the adjacent forms separated by perforations on the respective top and bottom thereof; and (e) without interrupting the continuous transport of forms, selectively, in response to step (c), during folding effecting severing of the last form in one job from the first form in the next job along the connecting perforations.

10. A method as recited in claim 9 wherein step (b) is practiced on the first or last form in a job.

11. A method as recited in claim 9 comprising the further step (e) of conveying each job, after step (d), away from the following job.

12. A method as recited in claim 9 wherein step (b) is practiced so as to apply the marks within a window having the top thereof spaced from the leading edge of each form on which marks are applied a predetermined first distance, and having the bottom thereof spaced a predetermined second distance from the leading edge; and wherein step (c) is effectively practiced only within said window.

13. A method as recited in claim 9 comprising the further step of marking the exterior edge of at least one of the forms at the area of severing so that the interface between jobs is visually indicated.

14. A method as recited in claim 9 wherein step (e) is practiced in part by sensing the limits of travel of the forms during festooning.

15. A method as recited in claim 9 wherein step (b) is practiced by applying bar code marks.

16. A method as recited in claim 9 wherein step (c) is practiced by scanning the marks, inputting scanned information into a shift register, and producing a control signal once the shift register is filled.

17. A method as recited in claim 9 wherein step (b) is practiced by applying a detectable mark to each form, and wherein steps (c) and (e) are practiced to count the number of marks, and to effect severing after a predetermined count has been reached.

18. A method of separating the forms comprising individual jobs from a continuous flow of forms, each form being connected by perforations to adjacent forms, and utilizing a movable folding element, comprising the steps off (a) continuously transporting the forms in a first direction;

(b) determining how many forms are in a particular job;

(c) counting the number of forms for the particular job until all of the forms for that job have been counted;

(d) folding the forms in a festooning manner so that each form has the adjacent forms separated by perforations on the respective top and bottom thereof;

(e) without interrupting the continuous transport of forms, selectively, in response to step (c), during folding effecting severing of the last form in one job from the first form in the next job along the connecting perforations; and wherein step (c) is practiced by sensing the ends of travel of the folding element during the practice of step (d).

19. A method as recited in claim 18 wherein step (c) is practiced during folding of the forms in step (d).

20. A method as recited in claim 16 wherein the control signal and the top of folder signal occur synchronously, to ensure reliable and repeatable control of the severing action in step (e).

21. Apparatus for automatically separating a continuous flow of business forms into predetermined jobs, each job comprising a plurality of business forms wherein each form is connected by perforations to another form, wherein detectable marks have been applied to at least one form of each job comprising:

means for transporting the forms in a first direction;

folding means for automatically folding the forms at their perforated connections to each other, said folding means comprising a swing chute mounted for oscillating movement about a generally horizontal axis and for receipt of forms therein; a plurality of spirals mounted for rotation about vertical axes and adjacent said swing chute, for receipt of the edges of the forms after engagement by said swing chute; and a plurality of beaters mounted for rotation about at least one axis parallel to said swing chute axis, for acting on the forms to keep them in operative association with said spirals;

means for automatically sensing the detectable marks on a form as it travels in the first direction, said means between a position where marks have been applied and said folding means;

severing means for automatically selectively severing the forms along a perforation between adjacent forms, during folding;

microprocessor controlled control means responsive to said sensing means for initiating operation of said severing means when predetermined detectable marks have been detected by said means; and limit switches for sensing the limit positions of said swing chute during swinging movement thereof, said control means operating said severing means after receipt of end of travel information from said limit switches.

22. Apparatus for automatically separating a continuous flow of business forms into predetermined jobs, each job comprising a plurality of business forms wherein each form is connected by perforations to another form, wherein detectable marks have been applied to at least one form of each job comprising:

means for transporting the forms in a first direction;

folding means for automatically folding the forms at their perforated connections to each other, said folding means comprising a swing chute mounted for oscillating movement about a generally horizontal axis and for receipt of forms therein; a plurality of spirals mounted for rotation about vertical axes and adjacent said swing chute, for receipt of the edges of the forms after engagement by said swing chute; and a plurality of beaters mounted for rotation about at least one axis parallel to said swing chute axis, for acting on the forms to keep them in operative association with said spirals;

means for automatically sensing the detectable marks on a form as it travels in the first direction, said means between a position where marks have been applied and said folding means;

severing means for automatically selectively severing the forms along a perforation between adjacent forms, during folding;

microprocessor controlled control means responsive to said sensing means for initiating operation of said severing means when predetermined detectable marks have been detected by said means; and hold down brushes for holding down and smoothing the forms adjacent the area of mark sensing.

23. Apparatus for automatically separating a continuous flow of business forms into predetermined jobs, each job comprising a plurality of business forms wherein each form is connected by perforations to another form, wherein detectable marks have been applied to at least one form of each job comprising:

means for transporting the forms in a first direction;

folding means for automatically folding the forms at their perforated connections to each other, said folding means comprising a swing chute mounted foroscillating movement about a generally horizontal axis and for receipt of forms therein; a plurality of spirals mounted for rotation about vertical axes and adjacent said swing chute, for receipt of the edges of the forms after engagement by said swing chute; and a plurality of beaters mounted for rotation about at least one axis parallel to said swing chute axis, for acting on the forms to keep them in operative association with said spirals;

means for automatically sensing the detectable marks on a form as it travels in the first direction, said means between a position where marks have been applied and said folding means;

severing means for automatically selectively severing the forms along a perforation between adjacent forms, during folding including a cutting blade;

microprocessor controlled control means responsive to said sensing means for initiating operation of said severing means when predetermined detectable marks have been detected by said means; and limit switch means for sensing the home position of said severing means, and means for automatically returning said severing means to said home position after severing of forms along a perforation.

* * * * *